Sept. 8, 1970  J. E. LEONARD  3,527,365

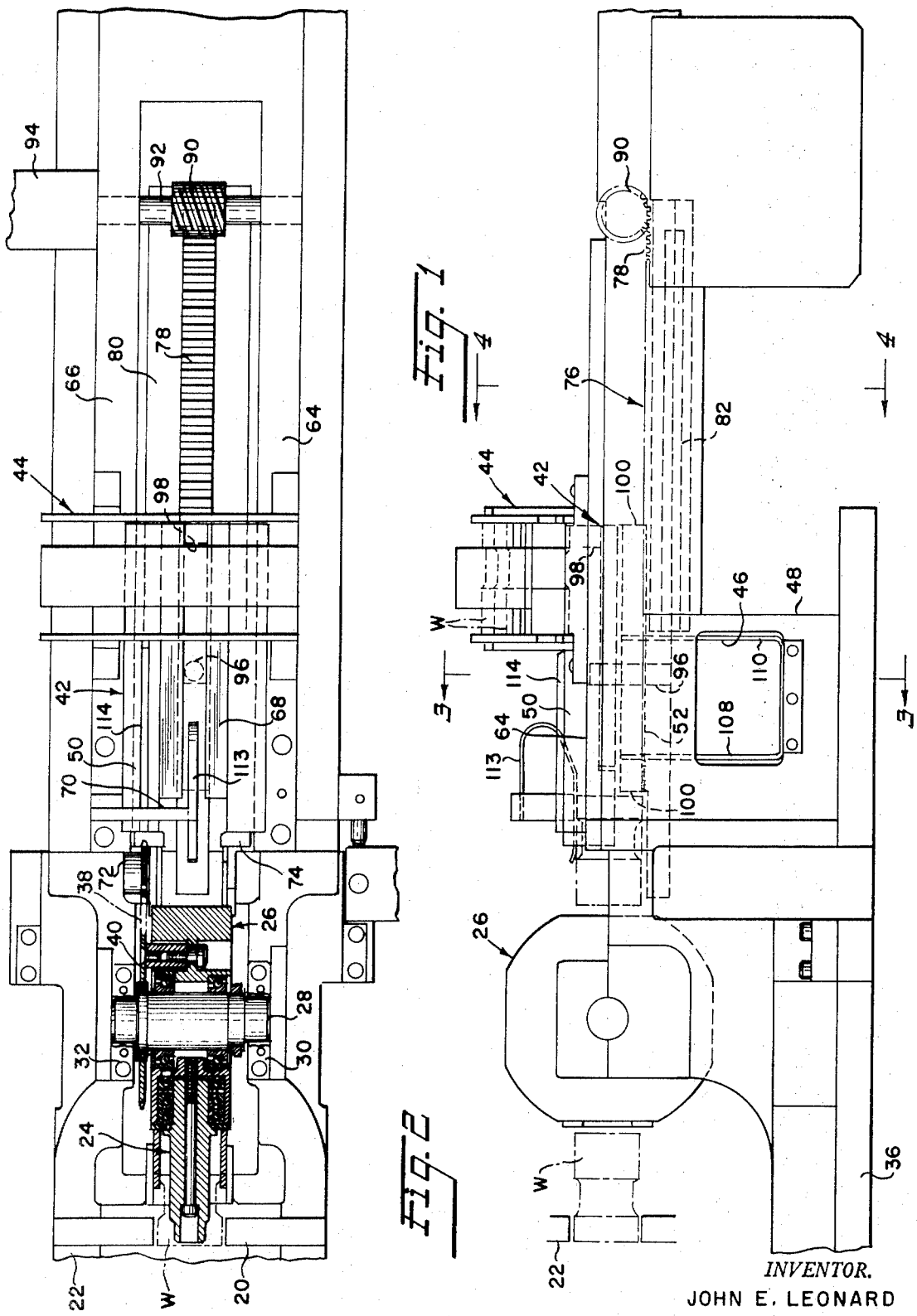

WORKPIECE FEEDING MECHANISM

Filed Oct. 31, 1968  4 Sheets-Sheet 2

INVENTOR.
JOHN E. LEONARD
BY
Strauch Nolan Neale Nies + Kurz
ATTORNEYS

INVENTOR.
JOHN E. LEONARD

INVENTOR.
JOHN E. LEONARD
BY Strauch Nolan Neale Nies + Kurz
ATTORNEYS

United States Patent Office 3,527,365
Patented Sept. 8, 1970

3,527,365
WORKPIECE FEEDING MECHANISM
John E. Leonard, Waynesboro, Pa., assignor to Landis Machine Company, Waynesboro, Pa., a corporation of Pennsylvania
Filed Oct. 31, 1968, Ser. No. 772,142
Int. Cl. B23q 5/22
U.S. Cl. 214—1.3                3 Claims

ABSTRACT OF THE DISCLOSURE

Apparatus for feeding workpieces to and removing workpieces from a work forming station which is typically located between a pair of opposed dies which rotate about parallel axes. A shuttle delivers workpieces to and removes workpieces from an arbor swingable between the forming station and a loading station, the shuttle receiving workpieces from an upper chute and delivering workpieces to a lower outlet chute after delivery of the workpieces to the arbor. The upper and lower chutes are automatically blocked except when the shutter receives or delivers a workpiece.

BACKGROUND OF THE INVENTION

This invention relates generally to apparatus for forming workpieces between a pair of rotating dies. Recent developments in such apparatus and the discovery of improved techniques have made it possible to form gears, such as those used in automotive transmissions, by rolling on a mass production basis. An example of such apparatus and technique is disclosed and claimed in copending application Ser. No. 618,750, now abandoned owned by applicant's assignee. In this prior apparatus the workpieces are positioned on an arbor between a pair of opposed dies rotatable about parallel axes. The workpieces are formed by displacing one die toward the other to bring both dies into contact with the workpiece. The dies are then separated and the workpieces are withdrawn and replaced by an unformed workpiece.

The workpieces are moved toward and away from the work station by a turret assembly having four equally spaced arbors. While the workpiece positioned on one of the arbors is being rolled at the forming station between the dies another workpiece is loaded on the opposite horizontally extending arbor. The turret assembly is then indexed 90° to carry the finished workpiece toward the forming station and the new workpiece toward the forming station.

As is well known in the art, gears and their associated support structure assume many forms. Often multiple gears are located at spaced point along a common shaft or a single or double gear is positioned at one end of the integrally formed support shaft.

The apparatus disclosed in the aforesaid copending application 618,750 is capable of handling several forms of gears which are frequently encountered in industrial and commercial applications. Nevertheless, there are many forms of gears which are beyond the capability of the work feed mechanism disclosed in the aforesaid application.

Another work feeding mechanism which has been developed to increase the versatility of the mechanism of application Ser. No. 618,750 is disclosed in copending application Ser. No. 763,653 filed Sept. 30, 1968 for Work Feed Mechanism, also owned by applicant's assignee. In this apparatus, which is particularly useful in handling workpieces in which the gear is formed adjacent one end of an elongated supporting shaft, the four arbor turret assembly is replaced with a turret assembly having a single arbor which is periodically swung between a horizontal position at the working station and a vertical position at the loading station and the workpieces are moved onto the arbor and removed from the arbor by vertical motion.

SUMMARY OF THE INVENTION

It is the principal purpose and object of the present invention to provide an improved work handling mechanism which permits the use of the basic rolling mechanism shown in the aforesaid application Ser. No. 618,750 and similar mechanisms in the mass production of workpieces particularly gears formed at the opposite ends of a common integral shaft.

In obtaining this and other objects the present invention provides a turret type mechanism having one or more workpiece supporting arbors which are indexed between a first position in which the arbor extends horizontally between the work forming dies and a second position 180° away from the forming station. A shuttle mechanism, interposed between upper and lower offset work feeding and work outlet chutes, accepts individual workpieces from the inlet chute, transfers them horizontally onto the arbor, removes them from the arbor and delivers them to the outlet chute. As the shuttle carries the workpieces toward the arbor, the workpieces pass over the outlet chute. A unique drive mechanism, including a drive member connected to the shuttle by lost-motion connection, is automatically interposed in blocking position over the inlet chute to support the workpiece for passage to the arbor. When the shuttle is actuated to remove the workpiece from the arbor the drive member is automatically retracted to remove the support from the workpiece which then passes to the outlet chute.

Additional objects and advantages will become apparent as the description proceeds.

DESCRIPTION OF DRAWINGS

FIG. 1 is a top plan view of a portion of a roll forming apparatus including the workpiece feed mechanism of the present invention;

FIG. 2 is a side view of the apparatus of FIG. 4;

DESCRIPTION OF PREFERRED EMBODIMENT

Figure 3:
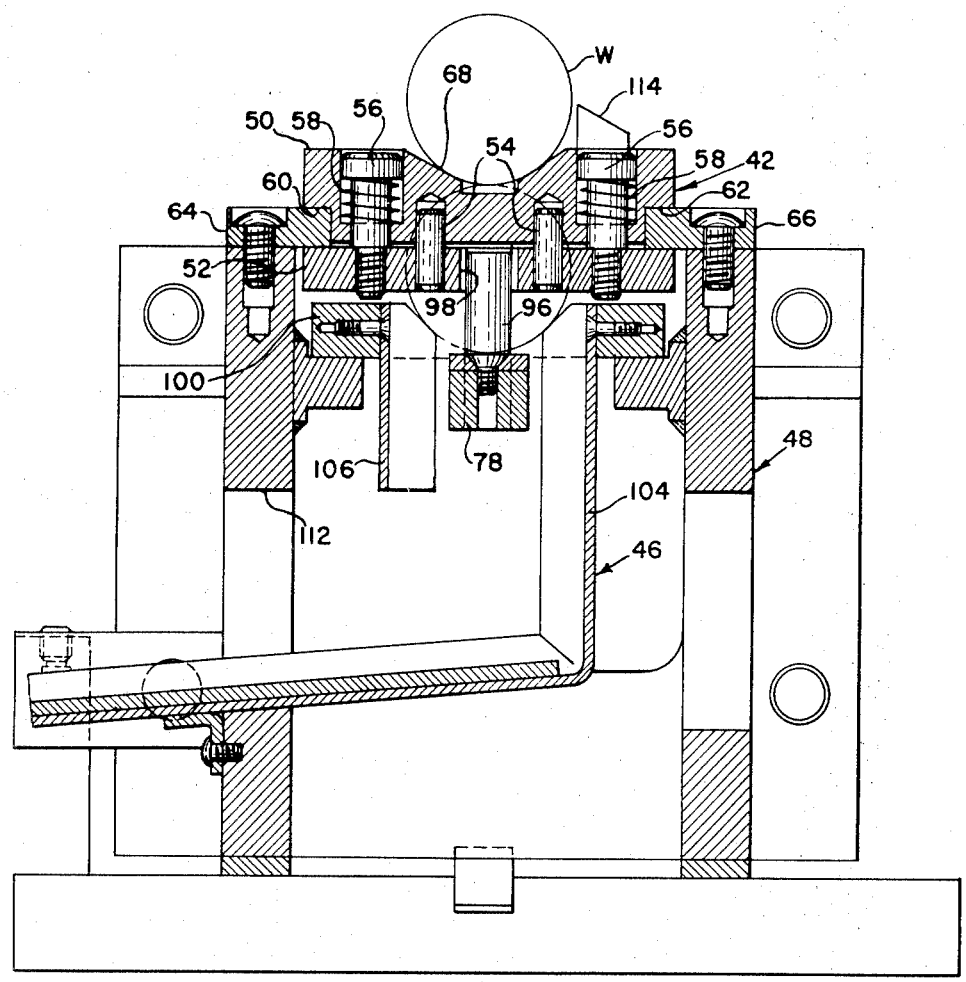
FIGS. 3 and 4 are transverse sections taken along lines 3—3 and 4—4, respectively, of FIG. 1.

For present purposes, the work feeding and transfer mechanism of the present invention will be disclosed as applied to a gear rolling apparatus the type disclosed in the aforementioned copending application Ser. No. 618,750, only a portion of this apparatus being disclosed in FIGS. 1 and 2.

The rolling apparatus is of the infeed type in which workpiece W is operated on simultaneously by a pair of opposed identical dies 20 and 22 rotating in the same direction.

The axis of the die 70 is fixed and the axis of the opposed die 22 is laterally shifted between the rolling polition and a retracted position shown to permit the removal of the finished workpiece and the positioning of the next workpieces to be rolled. The apparatus for rotating the dies and for shifting the die 22 has been omitted as unnecessary to an understanding of the present invention and is fully disclosed in the aforementioned application Ser. No. 618,750.

The work feeding mechanism, with which the invention is particularly concerned, is particularly effective for handling workpieces of the type illustrated, i.e., having a central through bore and relatively large end portions separated by a relatively reduced central portion.

As shown in FIG. 1 the workpiece is supported between the dies 20 and 22 on an arbor assembly 24 rotatably supported on a turret assembly 26 in turn rotatably mounted on a fixed shaft 28 carried by suitable bearing structures 30 and 32 mounted on a base plate 36.

As disclosed in application Ser. No. 618,750 the base plate 36 is mounted for lateral shifting movement on the main machine bed (not shown) and, in operation, is laterally displaced toward the die 20 half the displacement of the die 22 to maintain the workpiece centered between the two dies. A suitable drive motor, not shown, is connected by a chain 38 to a sprocket 40 secured to the turret assembly 26, the motor being effective periodically to index the arbor assembly 24 between the position shown in FIG. 1 and an opposed aligned position shown in FIG. 5, for example. The turret assembly and its associated indexing mechanism may be as disclosed in Ser. No. 618,750 or it may have two arbors in which case the indexing mechanism is modified to produce 180° indexing movements.

A shuttle assembly, indicated generally at 42, which forms a principal component of the present invention, and which will be described in detail below, is effective to transfer workpieces from an upper gravity fed work feed chute assembly, indicated generally at 44, onto the arbor 24 when the arbor occupies the FIG. 5 position, thereafter removing the finished workpiece from the arbor and delivering it to a lower outlet chute 46. The upper and lower chute sections together with the shuttle assembly and the associated drive mechanism are all mounted on an extension 48 of the main fixture body.

The shuttle assembly comprises upper and lower blocks 50 and 52 held in aligned relation by a plurality of pins 54 pressed fitted into the lower block 52 and slidably received in the upper block 50. The two blocks are held together by plurality of screws 56 extending freely through the upper block 50 and threaded into the lower block 52. Springs 58 are compressed between the under surfaces of the heads of the screws 56 and the bottoms of the bores in which the screws are received to spring press the blocks together to urge the surfaces of marginal recesses 60 and 62 into frictional contact with guide ways 64 and 66 suitably secured to an upper portion of the fixture body extension 48. The upper surface of the upper shuttle block 50 is formed with an upwardly facing recess 68 which slides under the lowermost one of the workpieces in the upper chute 44 and holds the workpiece again vertical movement at all times except when the shuttle is in the fully retracted position shown diagrammatically in FIG. 7.

At its forward end the upper block 50 is cut away to form a work receiving cavity extending through the shutter from top to bottom and conforming generally to the rear portion of the workpiece. The workpiece receiving cavity 70 is defined in part by a pair of vertical clamp members 72 and 74 secured to the forward end of the upper shuttle block 50, the inner edges of the clamp members being adapted to project into the relatively reduced central body portion of the workpiece.

Figure 7:
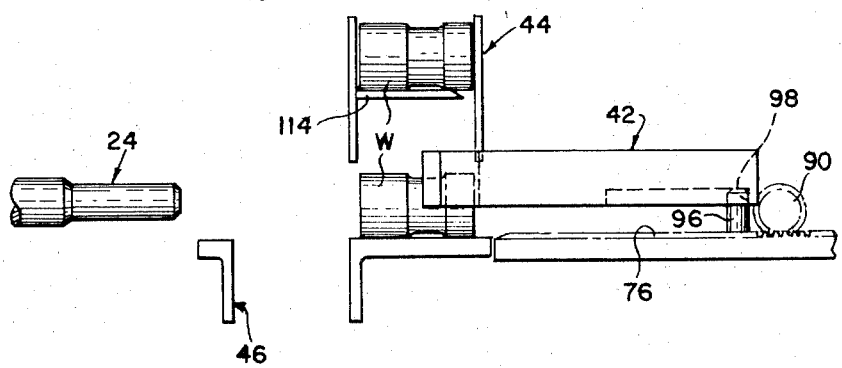
Figure 8:
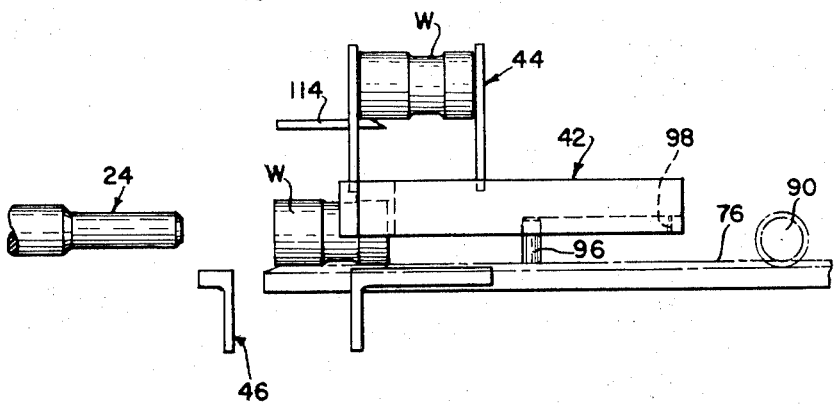

The shuttle assembly 42 is reciprocated between an advance position as shown in FIG. 2 and a retracted position as shown in FIG. 7 by a drive assembly 76 which includes a rack member 78 suitably secured to a support block 80 slidable along ways 82 and 84 secured to supports 86 and 88 rigid with the fixture body extension 48. The rack is reciprocated between the advance position shown in FIG. 2 and the retracted position shown in FIG. 7 by a pinion 90 carried by a transverse shaft 92 and driven by a reversible motor 94.

A lost-motion connection provided between the drive assembly 76 and the shuttle assembly 42 comprises a pin 96 pressed fitted into or otherwise rigidly secured to the drive assembly 76 and projecting upwardly into an elongated slot 98 in the lower shuttle block 52.

Figure 4:
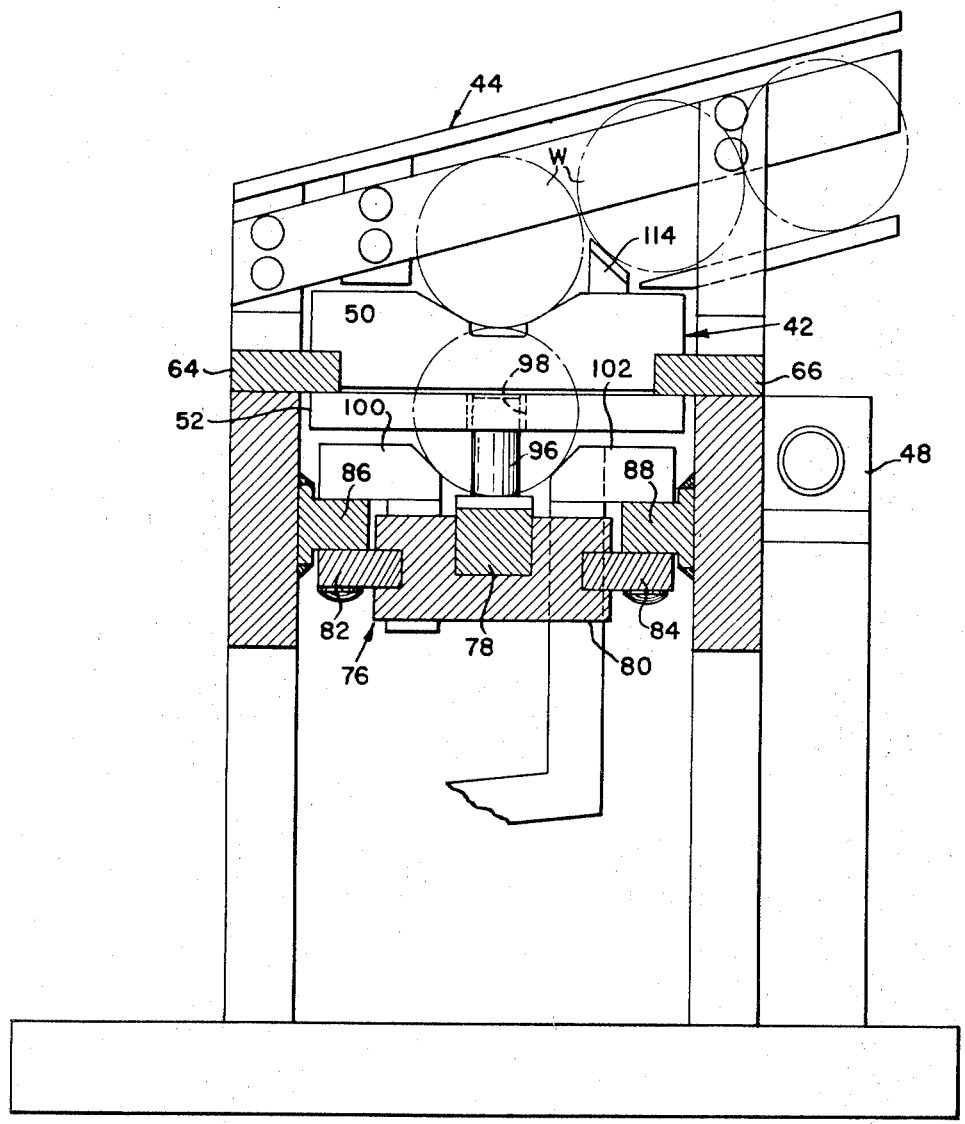

As best shown in FIGS. 3 and 4 the upper surface of the rack 78 forms the bottom of a workpiece receiving recess and guide way, the sides of which are formed by fixed blocks 100 and 102 secured to the upper surfaces of the frame support members 86 and 88. As shown in FIGS. 2, 3 and 4 the guide blocks 100 and 102 are interrupted at the upper end of the workpiece outlet chute 46 so that as the workpiece passes above the upper end of the chute 46 it is supported only by the rack 78. The workpiece outlet chute 46 comprises side frame members 104 and 106 and end plates 108 and 110 of a suitable configuration to permit the workpieces to drop vertically into the chute and guide the workpieces laterally out of the apparatus through an opening 112 provided in the side frame member of the fixture body extension 48.

Figure 5:
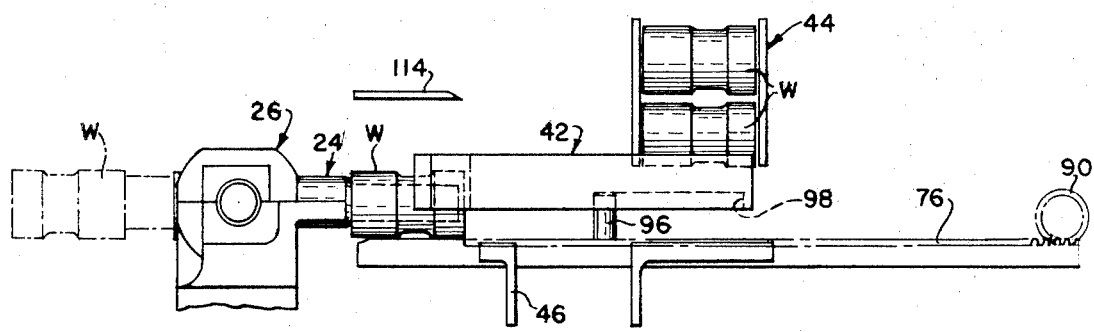
FIGS. 5-8 are semi-diagrammatic illustrations showing the relative position of the components of the work feeding mechanism at various points in a single complete cycle.
Figure 6:
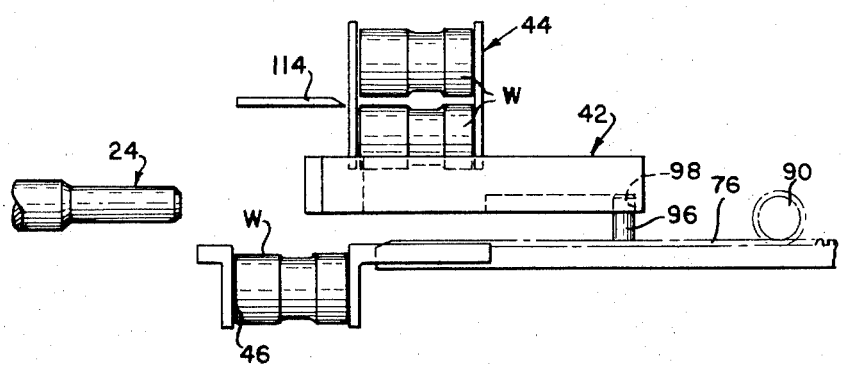

The overall operation of the mechanism will now be considered assuming that the parts occupy the position of FIG. 5, i.e., that one of the arbors 24 has just delivered a finished workpiece to the position shown. The pinion 90 is then rotated in a counterclockwise direction to displace the drive assembly 76 to the right as viewed in FIG. 5, this movement continuing until the pin 96 reaches the opposite end of the slot 98 in the shuttle assembly 42. While the rack 78 is withdrawn from a position beneath the workpiece, the workpiece continues to remain within the shuttle cavity since it is supported by the arbor 24. In the continued movement of the drive assembly 76 the shuttle assembly 42 is withdrawn to the right carrying the workpiece with it. The forward edge of the workpiece passes onto the guide ways 100 and 102 while the trailing end of the workpiece continues to be supported by the arbor. In the continued movement of the part and immediately after the workpiece is withdrawn from the arbor it is carried over the outlet chute onto which it passes as the rack 78 is no longer in a supporting position. A spring 113, carried by the frame structure is provided to urge the trailing end of the workpiece into the outlet chute and to prevent tipping or cocking movement of the workpiece.

During the movement thus far described the workpieces in the upper feed chute section 44 are supported on the guide way 68 in the upper shuttle block 50. When the shuttle block 42 is completely retracted as shown in FIG. 7 the work receiving cavity 70 in the end of the shuttle is positioned in registry with the corresponding end of the incoming workpiece which then falls into the cavity and onto the guide ways 100 and 102. Preferably an escapement blade 114, carried by the shuttle assembly, is utilized to prevent the downward movement of the remaining workpieces in the chute 44.

The pinion 90 is then reversed and rotated in a clockwise direction to move the drive assembly 76 to the left, the shuttle 42 remaining stationary until the pin 96 reaches the opposite of the slot 98 in the shuttle assembly. This motion disposes the rack 78 in supporting position beneath the workpiece W. In the continued movement of the parts the workpiece passes over the outlet chute 46, being supported by the rack 78, and is ultimately deposited on the arbor 24 to restore the parts to the position shown in column 3. In this motion the escapement blade 114 is also withdrawn from the work chute 44 to permit the next succeeding workpiece to drop onto the upper surface of the shuttle assembly. The turret assembly 26 is then indexed to carry the arbor 24 and with it the workpiece to or toward the rolling position shown in FIG. 2. Simultaneously another arbor carrying a finished workpiece is indexed to the loading station for removal as described.

What is claimed and desired to be secured by Letters Patent is:

1. A work feed mechanism for sequentially transferring workpieces from an upper feed chute to a loading station horizontally offset from said feed chute and then to a lower outlet chute positioned horizontal between said inlet chute and said loading station, comprising a shuttle movable horizontally between a retracted position in which a workpiece receiving cavity therein is disposed beneath said inlet chute and an advanced position in which said cavity is disposed at said loading station, a drive member beneath said shuttle, means providing a lost-motion connection between said drive member and said shuttle whereby said drive member extends beneath said cavity to support said workpiece as said cavity passes over said outlet chute on the advance stroke of said shuttle and is out of registry with said cavity during the retract stroke of said shuttle to permit the passage of workpieces into said outlet chute from said cavity.

2. Apparatus for depositing workpieces on and removing workpieces from a support member comprising a shuttle movable in an essentially horizontal path toward and away from said support member, drive means for reciprocating said shuttle along said path, an outlet chute beneath the path of said shuttle for receiving workpieces, means on said shuttle for positively moving said workpieces over said outlet chute as said shuttle is reciprocated, and blocking means associated with said drive means for blocking said chute as said workpiece move toward said member and for opening said chute as said workpieces are moved away from said member by said shuttle.

3. Apparatus for depositing workpieces on and removing workpieces from a support member comprising a shuttle movable in an essentially horizontal path through an advance stroke to deposit a workpiece on said member and a retract stroke to remove the workpiece from said member, said shuttle having a workpiece receiving cavity extending through said shuttle from top to bottom, a workpiece feed chute above the path of said shuttle through which workpiece pass to said shuttle, a workpiece outlet chute beneath the path of said shuttle through which workpieces pass from said shuttle, said outlet chute being offset from said inlet chute in a direction toward said supporting member, a drive member positioned beneath said shuttle, means providing a lost-motion connection between said drive member and said shuttle whereby said drive member extends beneath said cavity to support said workpiece during the advance stroke of said shuttle and is out of registry with said cavity during the retract stroke of said shuttle to permit the passage of workpieces from said cavity into outlet chute during the retract stroke of said shuttle.

References Cited
UNITED STATES PATENTS 2,699,697   1/1955   Kelso.
3,272,040   9/1966   Lechot _____ 214—1.2 XR GERALD M. FORLENZA, Primary Examiner F. E. WERNER, Assistant Examiner

U.S. CL. X.R.

214—1